US007004680B2

(12) United States Patent
Commander et al.

(10) Patent No.: US 7,004,680 B2
(45) Date of Patent: Feb. 28, 2006

(54) TEMPORARY SUPPORT ASSEMBLY AND METHOD OF SUPPORTING A FLEXIBLE LINE

(75) Inventors: Mark W. Commander, Gladewater, TX (US); Louis W. Brown, Ellisville, MS (US); Robert G. McMahon, Terrytown, LA (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/753,659

(22) Filed: Jan. 8, 2004

(65) Prior Publication Data

US 2005/0152747 A1   Jul. 14, 2005

(51) Int. Cl.
*F16L 3/00*   (2006.01)
(52) U.S. Cl. ............................. 405/168.1; 405/184.4; 248/80
(58) Field of Classification Search ............... 405/169, 405/166, 170, 114, 172, 158, 168.1, 168.4, 405/184.4; 248/75, 79, 80
See application file for complete search history.

(56) References Cited

U.S. PATENT DOCUMENTS

| | | | | | |
|---|---|---|---|---|---|
| 3,695,209 | A | * | 10/1972 | Giese ...................... | 114/230.24 |
| RE28,410 | E | * | 5/1975 | Cox et al. ................ | 405/168.3 |
| 3,910,609 | A | * | 10/1975 | Van der Gaag ............... | 285/24 |
| 4,075,862 | A | * | 2/1978 | Ames ......................... | 405/169 |
| 4,324,505 | A | * | 4/1982 | Hammett ..................... | 405/60 |
| 4,459,930 | A | * | 7/1984 | Flory .................... | 114/230.14 |
| 4,490,121 | A | * | 12/1984 | Coppens et al. ................ | 441/5 |
| 4,563,109 | A | * | 1/1986 | Ortemond ................ | 405/195.1 |
| 4,570,716 | A | * | 2/1986 | Genini et al. ................ | 166/346 |
| 4,645,467 | A | * | 2/1987 | Pollack ........................... | 441/4 |
| 4,650,431 | A | * | 3/1987 | Kentosh ........................ | 441/5 |
| 4,693,636 | A | * | 9/1987 | Fraser et al. ................. | 405/169 |
| 4,699,191 | A | * | 10/1987 | Pollack et al. ............... | 141/279 |
| 4,741,716 | A | * | 5/1988 | Hasebe et al. .................. | 441/4 |
| 5,025,742 | A | * | 6/1991 | Urdshals ................. | 114/230.12 |
| 5,041,038 | A | * | 8/1991 | Poldervaart et al. ........... | 441/5 |
| 5,162,005 | A | * | 11/1992 | Poldervaart ..................... | 441/3 |
| 5,269,629 | A | * | 12/1993 | Langner .................. | 405/195.1 |
| 5,639,187 | A | * | 6/1997 | Mungall et al. ......... | 405/195.1 |

(Continued)

OTHER PUBLICATIONS

Halliburton Internal Presentation—High Pressure flexible hose secured to rig by existing technology of the clamp and gooseneck; 1 page.
Halliburton Internal Presentation—5" and 3" Hanger Supports; 1 page.
Halliburton Internal Presentation—3" Hanger Support under construction to be shipped to an offshore facility to be permanently welded to structure; 1 page.

*Primary Examiner*—Michael Safavi
*Assistant Examiner*—Gay Ann Spahn
(74) *Attorney, Agent, or Firm*—John W. Wustenberg; Conley, Rose P.C.

(57) ABSTRACT

A support assembly for a flexible line comprises a hanger to suspend the flexible line from an offshore oil rig without subjecting the line to a bending stress adjacent the support assembly, a frame supporting the hanger, and a connector coupled to the frame to removeably connect the support assembly to the rig. In an embodiment, the support assembly further comprises a base that may be a plate, an open-ended box, or a plurality of beams. In another embodiment, the flexible line includes an end comprising a swivel plate that mates with the hanger.

21 Claims, 7 Drawing Sheets

U.S. PATENT DOCUMENTS

| | | | |
|---|---|---|---|
| 5,927,902 A * | 7/1999 | Sveen et al. | 405/169 |
| 6,234,260 B1 * | 5/2001 | Coast et al. | 175/113 |
| 6,305,882 B1 * | 10/2001 | Coast et al. | 405/232 |
| 6,328,502 B1 * | 12/2001 | Hickey et al. | 405/168.3 |
| 6,702,519 B1 * | 3/2004 | Stockstill | 405/168.3 |
| 2003/0231931 A1 * | 12/2003 | Moszkowski et al. | 405/158 |
| 2004/0218981 A1 * | 11/2004 | Chenin | 405/169 |
| 2004/0265066 A1 * | 12/2004 | Mackinnon | 405/170 |

* cited by examiner

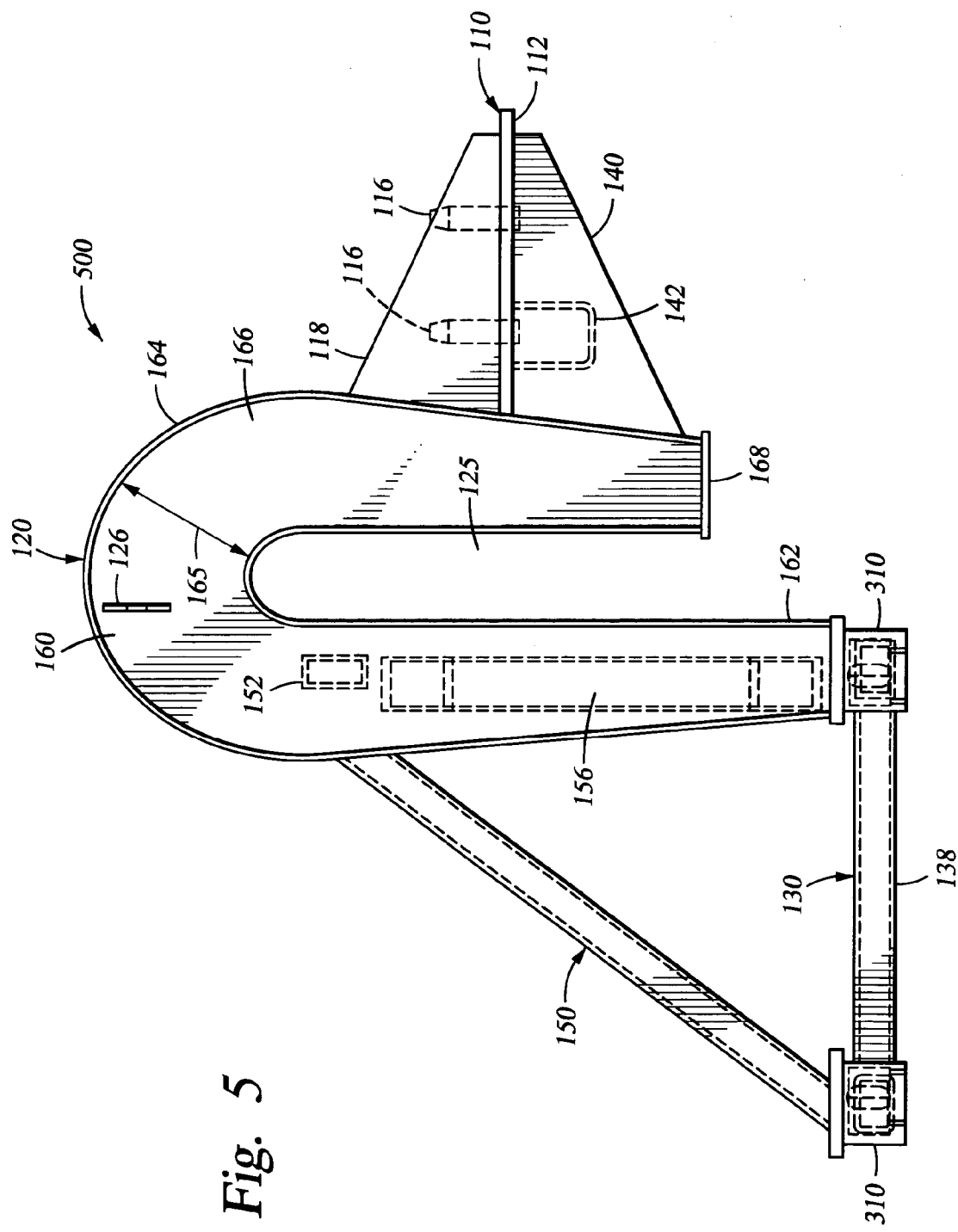

TEMPORARY SUPPORT ASSEMBLY AND METHOD OF SUPPORTING A FLEXIBLE LINE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to a temporary support assembly and method of suspending a flexible line from an offshore oil rig. More particularly, the present invention relates to a support assembly for a flexible line that removeably connects to an offshore oil rig, and a method for supporting the weight of a flexible line from an offshore oil rig without subjecting the line to a bending stress adjacent the support assembly.

BACKGROUND OF THE INVENTION

Flexible lines are used offshore for a variety of different operations, such as oil well stimulation, oil well fracturing, and the like. In one exemplary operation, a service vessel equipped with a reeled flexible line is positioned near an offshore oil rig. The flexible line is unreeled from the service vessel and lifted by a rig crane up to the oil rig where it connects into a service line to establish fluid communication with the well. Once the flexible line is connected to the service line, pumping equipment on the service vessel pumps fluid through the flexible line to perform the well servicing operation.

During such operations, the weight of the flexible line must be supported at the oil rig. However, a majority of offshore oil rigs have no established connection area for a temporary flexible line. Therefore, a temporary support assembly comprising a gooseneck and clamp is most commonly used to allow for positioning of the flexible line at any convenient location on the oil rig. It is not uncommon, for example, to bend the flexible line over a handrail along a walkway. Therefore, the gooseneck comprises a curved portion that extends over the handrail to support and elevate the flexible line as it wraps over the gooseneck. The weight of the flexible line is supported by a clamp below the gooseneck, which surrounds the flexible line and connects to either the oil rig or the gooseneck via cables.

The gooseneck and clamp are portable and versatile for use on different types of rigs, such as platforms, semi-submersible rigs, jackup rigs, drillships, and barges, for example. However, as the flexible line wraps over the gooseneck, it may be subjected to a bending stress should the line exceed its bend radius. Further, it is possible for the clamp to damage the outer wrap of the flexible line while supporting its weight.

Another type of support assembly for a flexible line comprises a permanent hanger mounted on the outside of the oil rig. In contrast to the gooseneck and clamp support assembly, the hanger suspends the flexible line substantially vertically from an end fitting so as to support its weight without subjecting the line to a bending stress adjacent the hanger and without damaging its outer wrap. However, rather than being portable, the hanger is permanently installed on the oil rig, such as by welding, for example. Therefore, the owner of the oil rig must agree to install this type of hanger. In addition, hot work permits and special procedures are required to weld such hangers since they are mounted outside of the safety handrails on the oil rig. Further, the hangers are not adaptable to support flexible lines of different sizes, such as 3-inch, 4-inch, or 5-inch internal diameter, so several hangers may be required per offshore oil rig. Therefore, a need exists for a portable, versatile, and temporary support assembly that supports the weight of the flexible line without subjecting it to a bending stress adjacent the support assembly and without damaging its outer wrap.

SUMMARY OF THE INVENTION

The present invention relates to a support assembly for a flexible line comprising a hanger to suspend the flexible line from an offshore oil rig without subjecting the line to a bending stress adjacent the support assembly, a frame supporting the hanger, and a connector coupled to the frame to removeably connect the support assembly to the rig. In an embodiment, the frame comprises two inverted U-shaped members that may be formed of a plurality of beams or a plurality of steel plates. In an embodiment, the support assembly further comprises a base that may be a plate, an open-ended box, or a plurality of beams. In another embodiment, the flexible line includes an end comprising a swivel plate that mates with the hanger.

In another aspect, the present invention relates to a support assembly that removeably connects to an oil rig for supporting the weight of a flexible line without subjecting the line to a bending stress adjacent the support assembly.

In yet another aspect, the present invention relates to a method for servicing a well from an offshore oil rig comprising removeably connecting a support assembly to the rig, suspending a flexible line from the support assembly without subjecting the line to a bending stress adjacent the support assembly, and pumping a treating fluid through the flexible line to service the well. In various embodiments, the method may further comprise unreeling the flexible line from a vessel positioned near the rig to the support assembly, connecting the flexible line to the well to establish fluid communication, removing the flexible line from the support assembly, or removing the support assembly from the rig.

In still another aspect, the present invention relates to a method comprising supporting a flexible line from a hanger removeably connected to an offshore oil rig wherein the line is not subjected to a bending stress adjacent the hanger.

BRIEF SUMMARY OF THE DRAWINGS

FIG. 5 is an enlarged, cross-sectional side view of another embodiment of a temporary support assembly;

DETAILED DESCRIPTION

Figure 1:
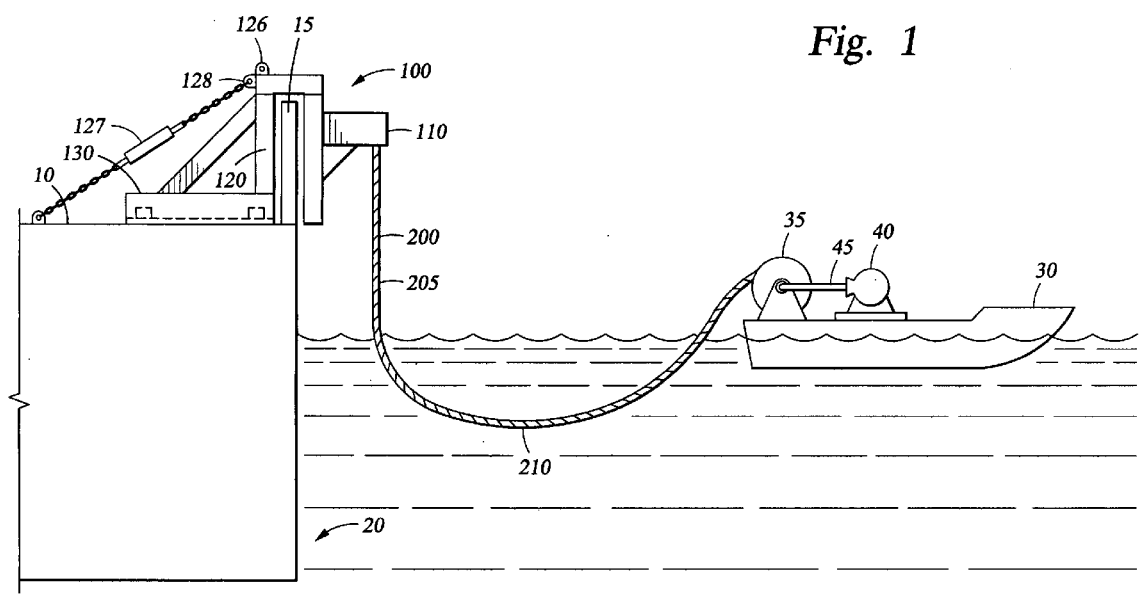
FIG. 1 is a simplified schematic side view of an exemplary operating environment for a temporary support assembly suspending a flexible line from on an offshore oil rig as the flexible line is being unreeled from a service vessel near the oil rig.

FIG. 1 schematically depicts an exemplary operating environment for a temporary support assembly 100 that may be positioned at any convenient location on an offshore oil rig 20. The position of the temporary support assembly 100 is governed, in part, by the location of the rig crane (not shown), which lifts the assembly 100 onto the rig 20. The temporary support assembly 100 may take a variety of different forms. In one embodiment, the temporary support assembly 100 comprises a hanger 110 designed to suspend a flexible line 200; a frame 120 that extends over a permanent structure on the oil rig 20, such as a handrail 15 for example, and a base 130 that rests on the deck 10 of the offshore oil rig 20.

The flexible line 200 is a temporary service line that may be used for a variety of different operations, such as well fracturing or well stimulation, for example. To perform a well servicing operation, a vessel 30 transports the temporary support assembly 100, the flexible line 200 wound onto a reel 35, the pumping equipment 40, and all other equipment and supplies necessary to perform the operation so that the vessel 30 can move from rig to rig. The vessel 30 is positioned near the oil rig 20, and a rig crane (not shown) lifts the temporary support assembly 100 via lift connectors 126 to position it onto the deck 10 of the oil rig 20 so that the frame 120 extends over the handrail 15. The temporary support assembly 100 is connected to the rig 20, as further described herein, then the flexible line 200 is unwound from the reel 35 on the service vessel 30 while the rig crane lifts the flexible line 200 to connect it to the hanger 110. A curve 210 or "belly" is formed in the flexible line 200 to maintain the correct bend radius between the vessel 30 and the oil rig 20.

As depicted in FIG. 1, the frame 120 of the temporary support assembly 100 extends over the handrail 15 on the oil rig 20 so that the hanger 110 suspends the flexible line 200 in a substantially vertical position outside the handrail 15 on the oil rig 20. Therefore, in contrast to a gooseneck, the temporary support assembly 100 supports the weight of the flexible line 200 without bending the line over the handrail 15 to impose a bending stress on the line adjacent the support assembly 100. Further, the temporary support assembly 100 suspends the flexible line 200 from the oil rig 20 without clamps or other devices that wrap around the flexible line 200 to potentially damage its outer wrap.

Figure 2:
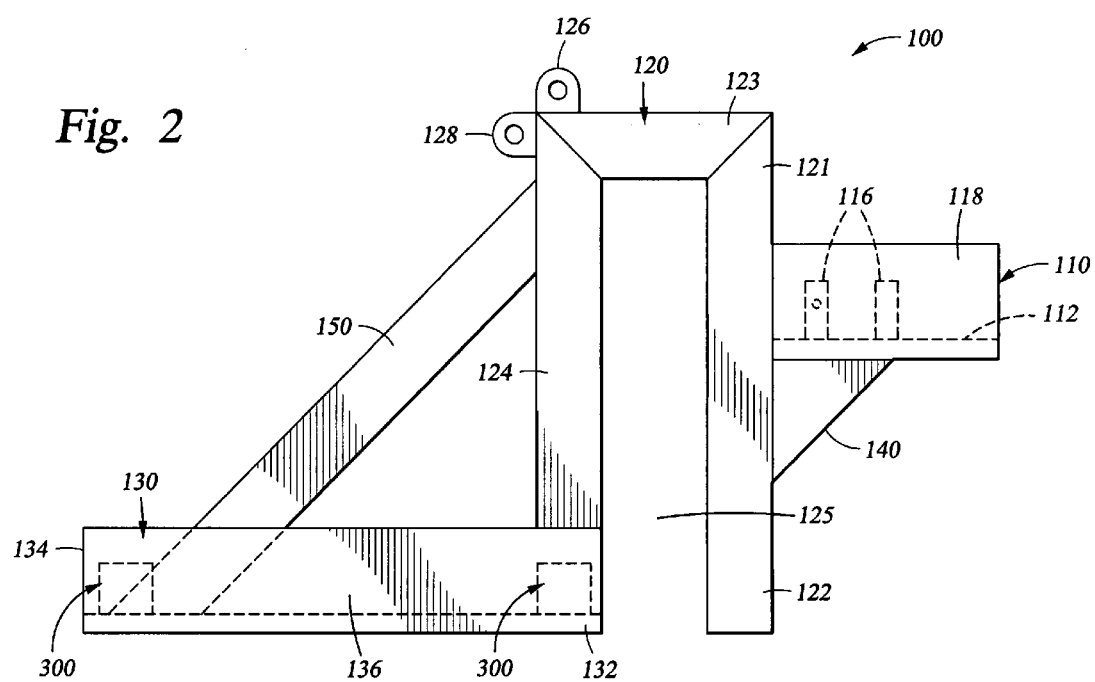
FIG. 2 is an enlarged side view of one embodiment of a temporary support assembly.
Figure 3:
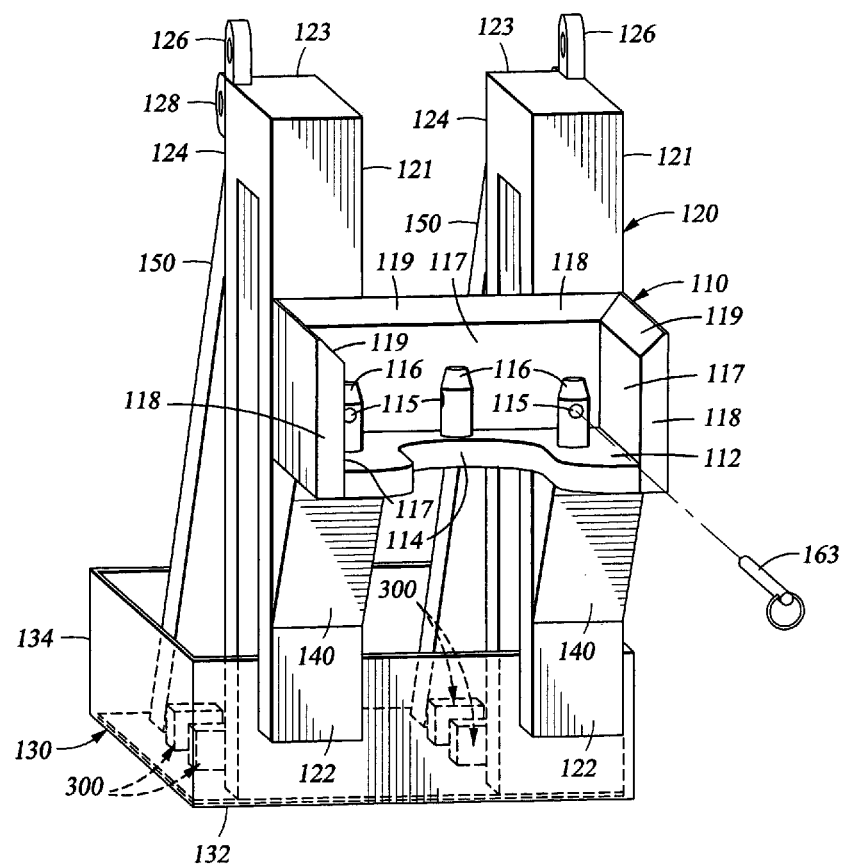
FIG. 3 is an enlarged front view of the temporary support assembly of FIG. 2.

FIG. 2 and FIG. 3 depict an enlarged side view and an enlarged front view, respectively, of one embodiment of the temporary support assembly 100 comprising a hanger 110, a frame 120, and a base 130. In an embodiment, the temporary support assembly 100 also comprises bracing components 140, 150 to provide stability to the hanger 110 and frame 120, respectively.

As best depicted in FIG. 3, the hanger 110 comprises a suspension plate 112 with a slot 114 formed therein for receiving the flexible line 200, a plurality of guide pins 116, and optional walls 118 extending upwardly from the edges of the suspension plate 112 on three sides. The guide pins 116 surround the slot 114 and extend upwardly from the suspension plate 112 to be received within corresponding ports in an end connector on the flexible line 200, as further described herein. The walls 118 comprise straight surfaces 117 transitioning into angled surfaces 119 that function to guide the end connector of the flexible line 200 toward the slot 114 and onto the guide pins 116. In an alternate embodiment, the hanger 110 comprises only the suspension plate 112 and guide pins 116 without the walls 118.

Referring again to FIG. 2 and FIG. 3, the frame 120 connects between the hanger 110 and the base 130 and comprises two substantially identical, inverted U-shaped members 121. In one embodiment, each of the inverted U-shaped members comprises a plurality of beams, namely a front vertical beam 122, a rear vertical beam 124, and a crossbeam 123 connected therebetween. As depicted in FIG. 3, in one embodiment, the inverted U-shaped members 121 are connected to the back surface of the hanger 110 at a width that inhibits the hanger 110 from twisting in response to wave forces acting on the flexible line 200. As depicted in FIG. 2, each inverted U-shaped member 121 includes a gap 125 wherein the handrail 15 on the rig 20 is received. The length of the crossbeam 123 defines the width of the gap 125 and the length of the rear vertical beam 124 defines the height of the gap 125. The gap 125 is dimensioned so that the inverted U-shaped members extend over the handrail 15 on the oil rig 20 without being supported on the handrail 15. In an embodiment, the width of the gap 125 is further dimensioned so that oil rig personnel may stand on the deck 10 and reach over the handrail 15 to connect the flexible line 200 to the hanger 110 without climbing over the handrail 15. By way of example only, the gap 125 may be at least 8-inches wide and 49-inches high. In an embodiment, the frame 120 further comprises lift connectors 126 for lifting the temporary support assembly 100 from the vessel 30 to the oil rig 20 and vice versa using the rig crane. In another embodiment, the frame 120 further comprises chain connectors 128 attached to the inverted U-shaped members 121. The chain connectors 128 are designed to receive chains and binders 127 to removeably connect the temporary support assembly 100 to the deck 10 of the oil rig 20. The position of the chain connectors 128 is exemplary only. As one of ordinary skill in the art will appreciate, the chain connectors 128 may be provided elsewhere on the temporary support assembly 100.

In one embodiment, the base 130 comprises a horizontal base plate 132. In another embodiment, the base 130 comprises an open-ended box 134 formed of a horizontal base plate 132 with walls 136 that extend vertically upwardly from all four edges of the base plate 132. The open-ended box 134 provides additional structural support as compared to the horizontal base plate 132 alone. Further, the open-ended box 134 provides a storage area for excess components, such as chains, binders, and slings, for example, so that these components may be transported from the vessel 30 to the oil rig 20 and vice versa when the temporary support assembly 100 is lifted by the rig crane. The base 130 may further comprise lock connectors 300 to removeably connect the temporary support assembly 100 to the deck 10 of the oil rig 20. The lock connectors 300 may be positioned near the four corners of the base plate 132, and they may be used in place of, or in combination with, chains and binders that attach to the chain connectors 128 on the frame 120.

Figures 4A, 4B, 4C:
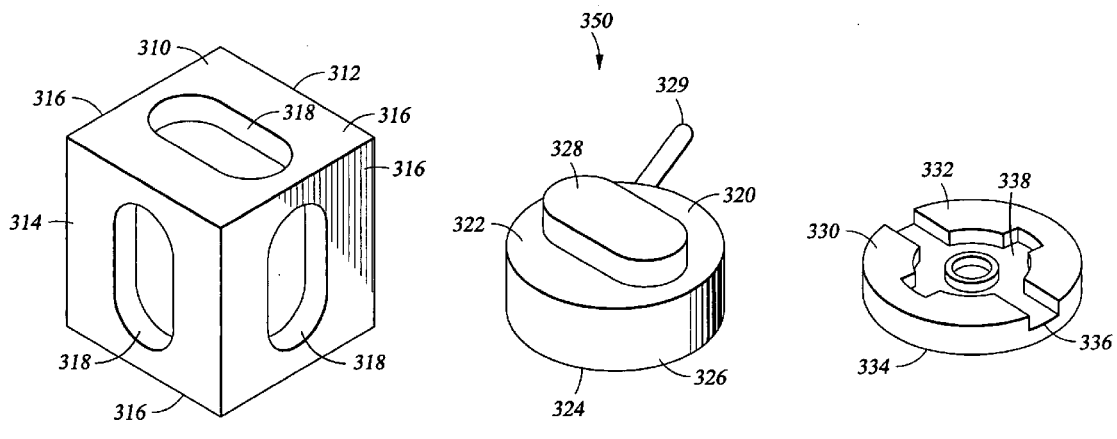
FIG. 4 is an isometric view of components that make up a locking assembly to removeably connect a temporary support assembly to an offshore oil rig.

Referring now to FIG. 4, in one embodiment, the lock connectors 300 comprise an International Organization for Standardization (ISO) Standard 1161 locking assembly 350 comprising a corner fitting 310, a portable locking component 320, and a fixed bottom component 330, called a deck socket. In FIG. 4, the components 310, 320, 330 of the locking assembly 350 are depicted separately so that the features of each component are discernable, but the locking assembly 350 is formed by connecting the intermediate component 320 between the deck socket 330 and the corner fitting 310. In one embodiment, the components 310, 320, 330 are formed of steel. In another embodiment, the components 310, 320, 330 are formed of aluminum.

The corner fitting 310 comprises a top surface 312, a bottom surface 314, and four side surfaces 316. In one embodiment, the bottom surface 314 and each of the side surfaces 316 include an oval port 318 extending therethrough. The corner fitting 310 is available from Tandemloc, Inc. of Havelock, N.C., Part Number 243000C.

The portable locking component 320 is generally disk-shaped and comprises a top surface 320, a bottom surface 324, and a rounded side surface 326. An oval locking portion 328 extends upwardly from the top surface 322, and a handle 329 extends radially outwardly from the side surface 326. In an embodiment, the portable locking component 320 is a "Twistlock, ISO lock, Breech fixed base, hot dipped galvanized", available from Peck & Hale, Inc. of West Sayville, N.Y., Part Number F656-R-C.

The deck socket 330 is generally disk-shaped and comprises a top surface 332, a bottom surface 334, and a rounded side surface 336. A cross-shaped recess 338 is provided in the top surface 332 of the deck socket 330. The deck socket 330 is available from Peck & Hale, Inc. of West Sayville, N.Y., Part Number F655.

The deck socket 330 is welded to the deck 10 of the oil rig 20, and the corner fitting 310 is welded to the horizontal base plate 132. The horizontal base plate 132 includes cut-out areas where the corner fittings 310 are welded thereto to expose the oval port 318 on the bottom surface 314 of the corner fitting 310.

To removeably connect the temporary support assembly 100 to the deck 10 of the oil rig 20, the bottom surface 324 of the portable locking component 320 is inserted into the cross-shaped recess 338 of the deck socket 330. Then the rig crane lifts the temporary support assembly 100 over the connected deck socket 330 and portable locking component 320 until the oval port 318 in the bottom surface 314 of the corner fitting 310 aligns with the oval locking portion 328 in the portable locking component 320. The rig crane lowers the temporary support assembly 100 into place so that the oval port 318 receives the oval locking portion 328. Then, the handle 329 on the intermediate component 320 is turned to lock the temporary support assembly 100 to the deck 10 of the oil rig 20. The handle 329 may be turned back to unlock the support assembly 100 from the deck 10 after the operation is complete.

Figure 6:
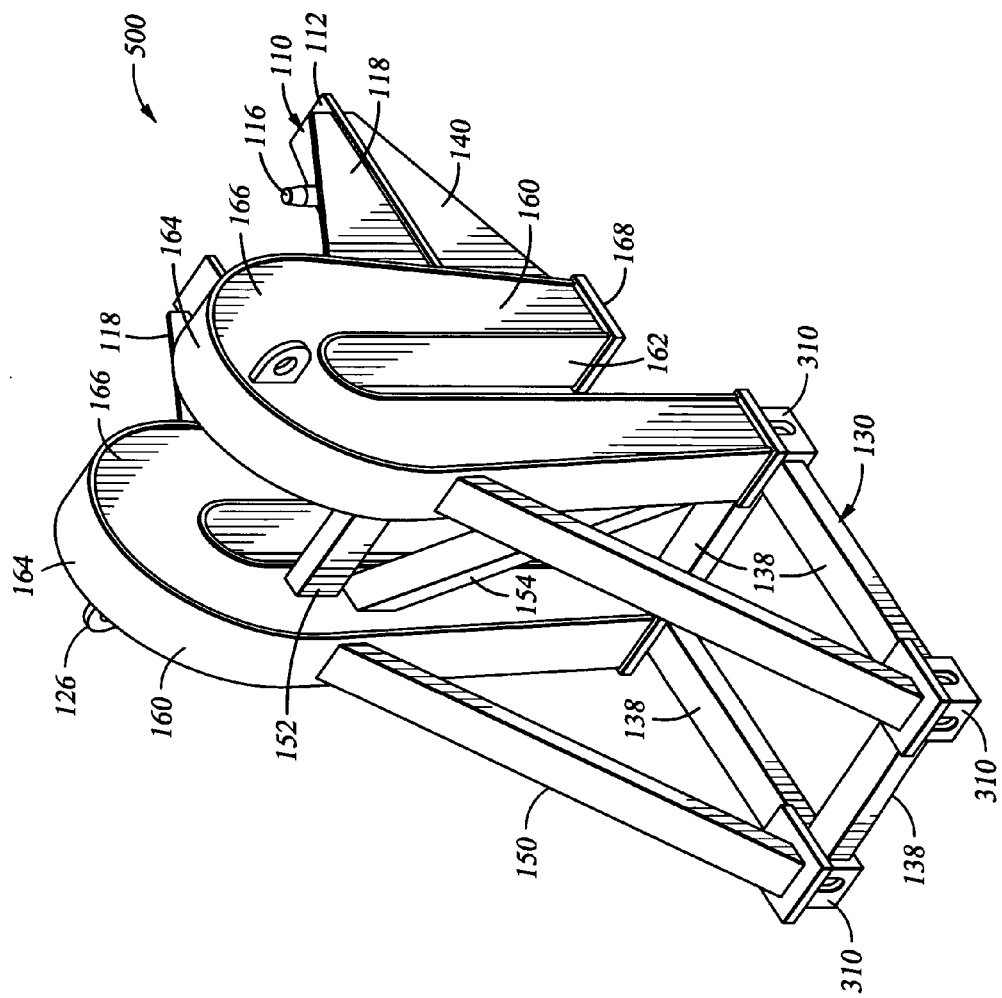
FIG. 6 is an enlarged, isometric rear view of the temporary support assembly of FIG. 5.

Referring now to FIG. 5 and FIG. 6, an enlarged cross-sectional side view and an enlarged isometric rear view, respectively, are depicted of a second embodiment of a temporary support assembly 500 comprising several design variations. Many components of the second temporary support assembly 500 are the same as the components of the first temporary support assembly 100, and those components maintain the same reference numerals. The second embodiment of the temporary support assembly 500 comprises a hanger 110, a frame 120, a base 130, and bracing components 140, 150 to provide stability to the hanger 110 and frame 120, respectively. An additional bracing component 142 for the hanger 110 and several bracing components 152, 154, 156 for the frame 120 may optionally be provided, as needed.

The frame 120 of the temporary support assembly 500 comprises two substantially identical, inverted U-shaped members 160. In one embodiment, each of the inverted U-shaped members 160 is hollow and comprises a plurality of steel plates, namely a U-shaped inner plate 162, a U-shaped outer plate 164, and vertically disposed flat plates 166 that connected therebetween on each end of the U-shaped plates 162, 164. Horizontally disposed flat plates 168 may also be connected at the ends of the U-shaped plates 162, 164 so as to enclose the frame 120. As best depicted in FIG. 5, the width 165 between the U-shaped plates 162, 164 is narrower towards the bottom of the plates 162, 164 where they connect to the base 130 and the hanger 110, and the width 165 expands toward the top of the plates 162, 164. This change in width 165 provides the required structural strength to support the weight of the flexible line 200. Also, because the inverted U-shaped members 160 are hollow, bracing components 156 may be disposed therewithin to provide additional strength and stability, as required.

The inverted U-shaped members 160 connect to the back surface of the hanger 110 at a width that inhibits the hanger 110 from twisting in response to wave forces acting on the flexible line 200. As depicted in FIG. 5, each inverted U-shaped member 160 includes a gap 125 wherein the handrail 15 on the rig 20 is received. The dimensions of the inner U-shaped plate 162 define the width and height of the gap 125, which is dimensioned so that the inverted U-shaped members 160 extend over the handrail 15 on the oil rig 20 without being supported on the handrail 15. In an embodiment, the width of the gap 125 is further dimensioned so that oil rig personnel may stand on the deck 10 and reach over the handrail 15 to connect the flexible line 200 to the hanger 110 without climbing over the handrail 15. By way of example only, the gap 125 may be at least 8-inches wide and 49-inches high.

As best shown in FIG. 6, in an embodiment, the frame 120 further comprises lift connectors 126 for lifting the temporary support assembly 100 from the vessel 30 to the oil rig 20 and vice versa using the rig crane. In another embodiment, the frame 120 further comprises chain connectors 128 (not shown) attached either to the inverted U-shaped members 160, or to the bracing members 152, 154 so as to receive chains and binders to removeably connect the temporary support assembly 500 to the deck 10 of the oil rig 20.

In one embodiment, the base 130 comprises a plurality of beams 138 formed into a rectangle and connected to the corner fittings 310 for removeably connecting the temporary support assembly 500 to the deck 10 of the oil rig 20. The corner fittings 310 may be provided at the four corners of the base 130, and they may be used in place of, or in combination with, chains and binders that attach to the chain connectors 128 (not shown) on the frame 120.

Figure 7:
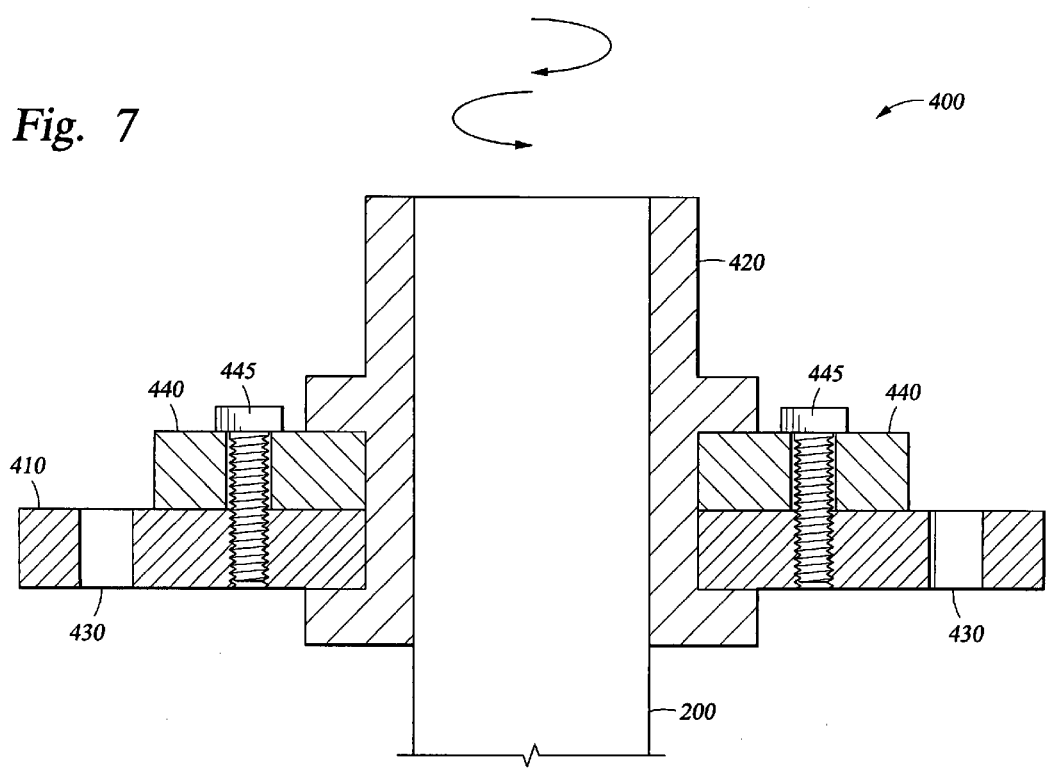
FIG. 7 is an enlarged side view, partially in cross-section, of an embodiment of a flexible line comprising a swivel plate end connection designed to mate with a temporary support assembly.

Once the temporary support assembly 100, 500 is locked into position on the deck 10 of the oil rig 20, the flexible line 200 may be lifted by the rig crane for connection to the hanger 110. FIG. 7 depicts a side view, partially in cross-section, of one embodiment of end connector for the flexible line 200, namely a swivel plate 400 comprising a generally square plate 410 with ports 430 therethrough, a collar 420, and a disk 440 that connects to the square plate 410 with bolts 445. The swivel plate 400 is designed to allow rotational movement of the square plate 410 with respect to the collar 420 to facilitate connection of the flexible line 200 to the hanger 110. In particular, if the flexible line 200 rotates as it is being unwound from the reel 35 and lifted by the rig crane for connection to the hanger 110, the square plate 410 may be rotationally misaligned with the square suspension plate 112. However, the swivel plate 400 allows rotational adjustment of the square plate 410 to align it with the suspension plate 112 without rotating the entire flexible line 200 back to the vessel 30.

Referring again to FIG. 3, after the square plate 410 is rotationally aligned with the suspension plate 112, it can be lowered onto the suspension plate 112 so that the guide pins 116 extend through the ports 430, the flexible line 200 extends through the slot 114, and the square plate 410 rests on the suspension plate 112. In one embodiment, the guide pins 116 include holes 115 to receive locking pins 163 that prevent the swivel plate 400 from inadvertently disconnecting from the suspension plate 112 due to vibration or wave forces acting on the flexible line 200. The temporary support assembly 100, 500 supports the weight of the flexible line 200 without the use of clamps or other members that wrap around the flexible line 200 to potentially damage its outer wrap 205.

Referring again to FIG. 1, once the flexible line 200 is suspended from the hanger 110, elbows and other fittings are connected between the collar 420 and a service line (not shown), which is routed on the rig 20 to the wellhead. Then the pump 40 on the service vessel 30 pumps well stimulation or fracturing fluid, for example, into an injection line 45 connected into the reel 35, which feeds directly into the flexible line 200 to begin the well service operation. During operation, the collar 420 connected to the flexible line 200 can rotate in response to wave forces without exerting a rotational force on the square plate 410. After the well service operation is complete, the flexible line 200 may be removed from the temporary support assembly 100, 500 and rewound onto the reel 35 on the service vessel 30. Then the temporary support assembly 100, 500 can be disconnected from the deck 10 of the oil rig 20 and lifted by the rig crane to be set down on the vessel 30 for transportation to another rig.

Thus, the temporary support assembly 100, 500 is portable and versatile. It removeably connects to an oil rig 20 for supporting the weight of a flexible line 200 without subjecting the line 200 to a bending stress adjacent the support assembly 100, 500 and without damaging its outer wrap. The foregoing descriptions of specific embodiments of the temporary support assembly 100, 500 and the systems and methods for suspending a flexible line 200 from an oil rig 20 have been presented for purposes of illustration and description and are not intended to be exhaustive or to limit the invention to the precise forms disclosed. Obviously many other modifications and variations are possible. The particular components that make up the temporary support assembly 100, 500 can vary. For example, the base 130 may comprise a horizontal base plate 132 or an open-ended box 134 or a plurality of beams 138, and the hanger 110 may comprise a suspension plate 112 without the side walls 118. In addition, the frame 120 may comprise a plurality of beams 122, 123, 124 or a plurality of steel plates 162, 164, 166, 168. Further, the lift connectors 126 and chain connectors 128 may be positioned elsewhere on the temporary support assembly 100. In addition, the lock connectors 300 may comprise an ISO Standard 1161 locking assembly 350, or may take a different form.

Thus, while various embodiments of the invention have been shown and described herein, modifications may be made by one skilled in the art without departing from the spirit and the teachings of the invention. The embodiments described here are exemplary only, and are not intended to be limiting. Many variations, combinations, and modifications of the invention disclosed herein are possible and are within the scope of the invention. Accordingly, the scope of protection is not limited by the description set out above, but is defined by the claims which follow, that scope including all equivalents of the subject matter of the claims.

What we claimed as our invention is:

1. A support assembly for a flexible line comprising:
   a hanger to suspend the flexible line from an offshore oil rig without subjecting the line to a bending stress adjacent the support assembly;
   a frame supporting the hanger wherein the frame comprises two inverted U-shaped members and each of the inverted U-shaped members attaches to the hanger;
   a base connected to the frame;
   a connector coupled to the frame, the base, or both to removeably connect the support assembly to the offshore oil rig; and
   lift connectors for lifting the support assembly.

2. The support assembly of claim 1 wherein the base comprises a base plate.

3. The support assembly of claim 1 wherein the base comprises a plurality of beams.

4. The support assembly of claim 1 wherein the hanger mates with a swivel plate on an end of the flexible line.

5. The support assembly of claim 1 wherein the hanger comprises a suspension plate having a slot through which the flexible line extends.

6. The support assembly of claim 5 wherein the hanger further comprises a plurality of walls for guiding the flexible line into the slot.

7. The support assembly of claim 1 wherein the frame extends over a handrail on the rig without being supported on the handrail.

8. The support assembly of claim 1 wherein the frame inhibits the support assembly from rotating due to forces acting on the flexible line.

9. The support assembly of claim 1 wherein the inverted U-shaped members comprise a plurality of beams.

10. The support assembly of claim 1 wherein the inverted U-shaped members comprise a plurality of steel plates.

11. The support assembly of claim 1 wherein the connector is disposed on the frame.

12. The support assembly of claim 1 wherein the connector is adapted to receive a chain and binder assembly.

13. The support assembly of claim 1 wherein the connector is coupled to the base and comprises an ISO locking assembly.

14. The support assembly of claim 1 wherein the support assembly is configured to support the weight of the flexible line.

15. The support assembly of claim 1 wherein the support assembly is configured to support the weight of the flexible line without damaging an outer wrap on the flexible line.

16. The support assembly of claim 1 wherein the base comprises an open ended box.

17. A support assembly for a flexible line comprising:
   a hanger to suspend the flexible line from an offshore oil rig without subjecting the line to a bending stress adjacent the support assembly;

a frame supporting the hanger;
a base connected to the frame;
a connector coupled to the frame, the base, or both to removeably connect the support assembly to the offshore oil rig; and
lift connectors for lifting the support assembly;
wherein the base comprises an open-ended box.

18. A support assembly for a flexible line comprising:
a hanger to suspend the flexible line from an offshore oil rig without subjecting the line to a bending stress adjacent the support assembly;
a frame supporting the hanger;
a connector coupled to the frame to removeably connect the support assembly to the offshore oil rig;
a plurality of guide pins for connecting the flexible line to the hanger and;
locking pins that fit into a hole in each of the guide pins to prevent the flexible line from inadvertently disconnecting from the hanger;
wherein the flexible line includes an end comprising a swivel plate with ports for receiving the guide pins.

19. A support assembly for a flexible line comprising:
a hanger to suspend the flexible line from an offshore oil rig without subjecting the line to a bending stress adjacent the support assembly;
a frame supporting the hanger;
a base connected to the frame; and
a connector coupled to the frame, the base, or both to removeably connect the support assembly to the offshore oil rig;
wherein the frame comprises two inverted U-shaped members and each of the inverted U-shaped members attaches to the hanger; and
wherein each of the inverted U-shaped members forms a gap for receiving a handrail on the rig.

20. The support assembly of claim 19 wherein the gap is dimensioned to receive the handrail without the inverted U-shaped members being supported by the handrail.

21. The support assembly of claim 19 wherein the gap is dimensioned to enable connection of the flexible line to the hanger from a deck on the rig.

* * * * *